United States Patent
Yoshida et al.

(10) Patent No.: US 7,664,320 B2
(45) Date of Patent: Feb. 16, 2010

(54) IMAGE PROCESSING APPARATUS, IMAGE PROCESSING METHOD, AND COMPUTER PRODUCT

(75) Inventors: Tomoyuki Yoshida, Tokyo (JP); Toshiya Hikita, Tokyo (JP); Hiroyuki Kawamoto, Kanagawa (JP); Takeharu Tone, Kanagawa (JP); Shuji Kimura, Kanagawa (JP); Atsushi Togami, Kanagawa (JP); Takumi Nozawa, Kanagawa (JP); Toshimi Yamamura, Kanagawa (JP); Akira Murakata, Tokyo (JP); Satoshi Ohkawa, Tokyo (JP); Manabu Komatsu, Tokyo (JP); Yasunobu Shirata, Tokyo (JP); Yukihiko Tamura, Kanagawa (JP)

(73) Assignee: Ricoh Company, Ltc., Tokyo (JP)

( * ) Notice: Subject to any disclaimer, the term of this patent is extended or adjusted under 35 U.S.C. 154(b) by 676 days.

(21) Appl. No.: 11/518,258

(22) Filed: Sep. 11, 2006

(65) Prior Publication Data

US 2007/0070438 A1  Mar. 29, 2007

(30) Foreign Application Priority Data

Sep. 21, 2005 (JP) .............................. 2005-274611

(51) Int. Cl.
G06K 9/00 (2006.01)
H04N 1/40 (2006.01)
(52) U.S. Cl. .................... 382/167; 382/307; 358/448
(58) Field of Classification Search ................. 382/167, 382/232, 276, 305, 307; 358/1.1, 1.5, 1.6, 358/1.9, 448, 501, 540
See application file for complete search history.

(56) References Cited

U.S. PATENT DOCUMENTS 6,160,913 A * 12/2000 Lee et al. ..................... 382/176
7,274,486 B2 * 9/2007 Takahashi et al. ............ 358/1.9

FOREIGN PATENT DOCUMENTS

| JP | 2001-223828 | 8/2001 |
|---|---|---|
| JP | 2002-111988 | 4/2002 |
| JP | 2003-216365 | 7/2003 |
| JP | 2003-224716 | 8/2003 |

OTHER PUBLICATIONS

Japanese Office Action dated Oct. 13, 2009.

* cited by examiner

*Primary Examiner*—Duy M Dang
(74) *Attorney, Agent, or Firm*—Harness, Dickey & Pierce, P.L.C.

(57) ABSTRACT

When image data is determined to be reused, a first image-data processing unit performs a first image processing on the image data, a memory device accumulates the image data on which the first image processing is performed, and a second image-data processing unit performs second image processing on the image data accumulated in the memory device. When the image data is determined not to be reused, the first image-data processing unit performs a first image processing, and the second image-data processing unit performs a second image processing on the image data on which the first image processing is performed.

19 Claims, 4 Drawing Sheets

IMAGE PROCESSING APPARATUS, IMAGE PROCESSING METHOD, AND COMPUTER PRODUCT

CROSS-REFERENCE TO RELATED APPLICATIONS

The present document incorporates by reference the entire contents of Japanese priority document, 2005-274611 filed in Japan on Sep. 21, 2005.

BACKGROUND OF THE INVENTION

1. Field of the Invention

The present invention relates to an image processing apparatus, such as a digital Multi Function Product (MFP) that functions as a copier, a facsimile, a printer, a scanner etc., an image processing method, and a computer product.

2. Description of the Related Art

Recently, a digital Multi Function Product (MFP) is increasingly used to accumulate and store digital image data on a built-in Hard Disk Device (HDD) and output the stored digital image data when necessary.

However, in many instances, when outputting the image data that is accumulated and stored in the HDD, a passage of time occurs between the time of accumulation and storage of the image data and the time of output. Circumstances of an operator who outputs the image data, in other words, requirements and needs of the operator change during such a passage of time, and the stored image data is incompatible with the changed requirements and needs of the operator.

For example, if a copy function is used during a facsimile transmission of the image data that is stored in the HDD, image quality of the image data differs significantly, thereby significantly reducing the productivity of the MFP.

Moreover, upon using the copy function, the image data, which is accumulated and stored in the HDD by combining two documents of A4 size on one transfer sheet of A4 size, is output by plotting the two documents of A4 size on two transfer sheets of A4 size. The image quality significantly differs during such a usage of the copy function, thereby significantly reducing the productivity.

To overcome the aforementioned drawbacks, in a technology disclosed in Japanese Patent Application Laid-Open No 2002-111988, a second image-data processing unit is included that carries out image processing on the image data that is stored and accumulated in the HDD.

In a technology disclosed in Japanese Patent Application Laid-Open No 2003-224716, when using another image processing unit to output the image data that is accumulated and stored in the HDD, the image data is corrected to predetermined characteristics during output to the other image processing unit.

However, the technology disclosed in Japanese Patent Application Laid-Open No 2002-111988 aims to enhance process speed by including the second image-data processing unit but a method to reuse the image data accumulated in the HDD included inside the MFP is not mentioned.

In the technology disclosed in Japanese Patent Application Laid-Open No 2003-224716, correction of the image data is carried out after the image data is accumulated in the HDD, thereby resulting in a low efficiency (process speed) of transaction of the accumulated image data. Moreover, because the aforementioned correction aims to suppress variation due to differences between individual image processing units, the correction does not deal with a modification in requirements during output such as a modification of destination (from a copy function to a facsimile transmission function) etc.

SUMMARY OF THE INVENTION

It is an object of the present invention to at least partially solve the problems in the conventional technology.

An image processing apparatus according to one aspect of the present invention includes an image reading unit that acquires image data from a document; a memory device that accumulates image data; a reuse determining unit that determines whether to reuse the image data; a first image-data processing unit that performs a first image processing on the image data; a second image-data processing unit that performs a second image processing on the image data on which the first image processing is performed; and an interface unit that outputs the image data on which the second image processing is performed, to an image processing unit that is connected to the interface unit. When the reuse determining unit determines to reuse the image data, the first image-data processing unit performs the first image processing that includes unifying characteristics of the image data into predetermined characteristics, the memory device accumulates the image data on which the first image processing is performed, and the second image-data processing unit performs the second image processing, which complies with the image processing unit or a processing mode of the image processing unit of an image output destination, on the image data accumulated in the memory device. When the reuse determining unit determines not to reuse the image data, the first image-data processing unit performs the first image processing, which complies with the image processing unit or a processing mode of the image processing unit of an image output destination, on the image data, and the second image-data processing unit performs the second image processing, which complies with the image processing unit or a processing mode of the image processing unit of an image output destination, on the image data on which the first image processing is performed.

A computer-readable recording medium according to another aspect of the present invention stores therein a computer program for controlling an image processing apparatus that includes an image reading unit that acquires image data from a document; a memory device that accumulates image data; a reuse determining unit that determines whether to reuse the image data; a first image-data processing unit that performs a first image processing on the image data; a second image-data processing unit that performs a second image processing on the image data on which the first image processing is performed; and an interface unit that outputs the image data on which the second image processing is performed, to an image processing unit that is connected to the interface unit. The computer program causes a computer to execute first performing, when the reuse determining unit determines to reuse the image data, including the first image-data processing unit performing the first image processing that includes unifying characteristics of the image data into predetermined characteristics, the memory device accumulating the image data on which the first image processing is performed, and the second image-data processing unit performing the second image processing, which complies with the image processing unit or a processing mode of the image processing unit of an image output destination, on the image data accumulated in the memory device; and second performing, when the reuse determining unit determines not to reuse the image data, including the first image-data processing unit performing the first image processing, which complies with the image processing unit or a processing mode of the image processing unit of an image output destination, on the image data, and the second image-data processing unit performing the second image processing, which complies with the image processing unit or a processing mode of the image processing unit of an image output destination, on the image data on which the first image processing is performed.

An image processing method according to still another aspect of the present invention is for an image processing apparatus that includes an image reading unit that acquires image data from a document; a memory device that accumulates image data; a reuse determining unit that determines whether to reuse the image data; a first image-data processing unit that performs a first image processing on the image data; a second image-data processing unit that performs a second image processing on the image data on which the first image processing is performed; and an interface unit that outputs the image data on which the second image processing is performed, to an image processing unit that is connected to the interface unit. The image processing method includes first performing, when the reuse determining unit determines to reuse the image data, including the first image-data processing unit performing the first image processing that includes unifying characteristics of the image data into predetermined characteristics, the memory device accumulating the image data on which the first image processing is performed, and the second image-data processing unit performing the second image processing, which complies with the image processing unit or a processing mode of the image processing unit of an image output destination, on the image data accumulated in the memory device; and second performing, when the reuse determining unit determines not to reuse the image data, including the first image-data processing unit performing the first image processing, which complies with the image processing unit or a processing mode of the image processing unit of an image output destination, on the image data, and the second image-data processing unit performing the second image processing, which complies with the image processing unit or a processing mode of the image processing unit of an image output destination, on the image data on which the first image processing is performed.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

Exemplary embodiments of the present invention are explained in detail below with reference to the accompanying drawings.

An embodiment of the present invention is explained with reference to FIG. 1 through FIG. 5. In an example explained according to the present embodiment, the image processing unit according to the present invention is applied to a digital color MFP that combines a copy function, a facsimile (fax) function, a printer function, and a function to distribute an input image (a read document image and an image input by the printer function or the fax function).

Figure 1:
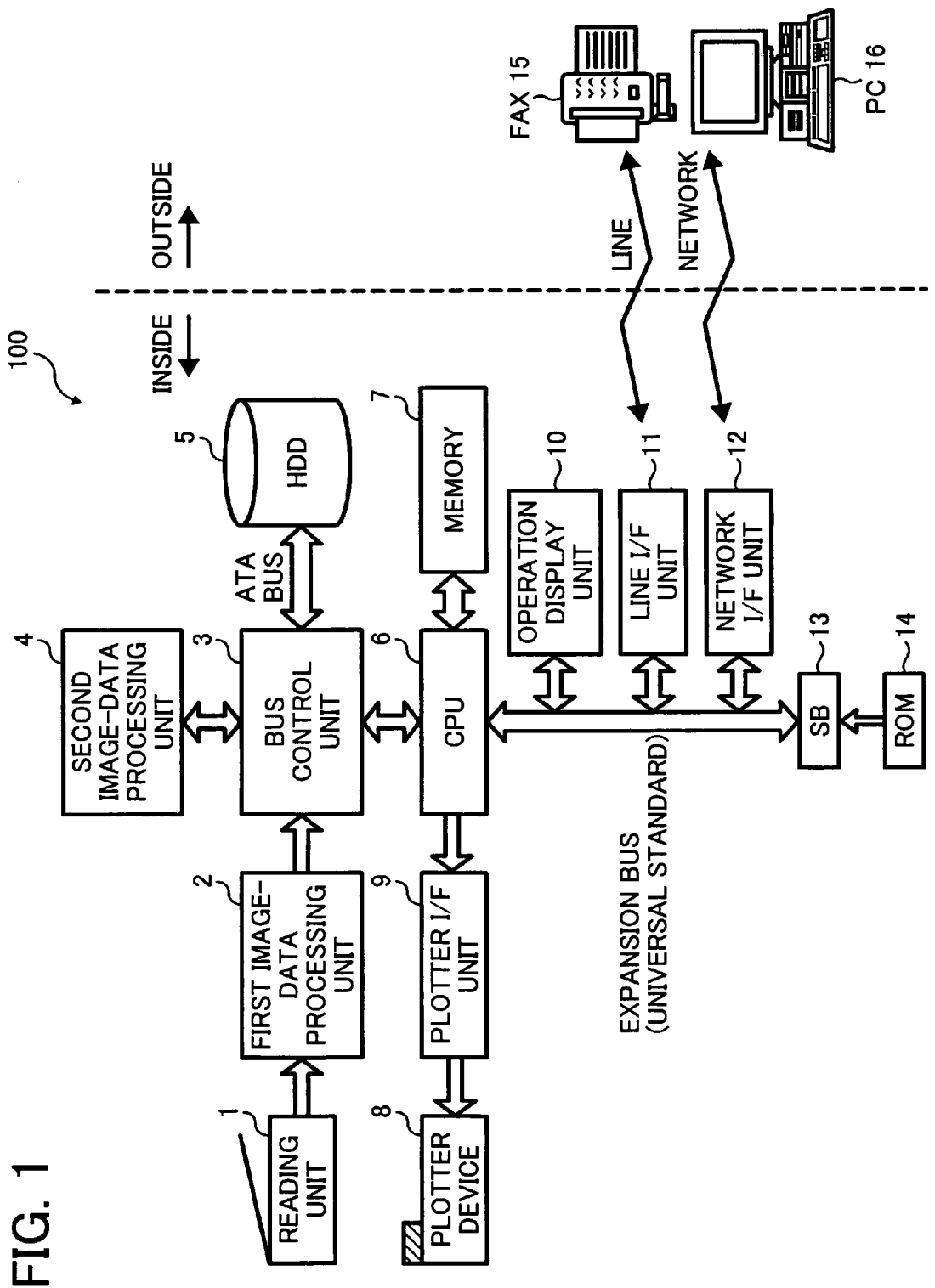
FIG. 1 is a block diagram of a system structure of a digital color MFP according an embodiment of the present invention.

FIG. 1 is a block diagram of a system structure of a digital color MFP 100 according to the present embodiment. The digital color MFP 100 shown in FIG. 1 includes a reading unit 1 that is an image reading unit, a first image-data processing unit 2, a bus control unit 3, a second image-data processing unit 4, an HDD 5 that is a memory device, a Central Processing Unit (CPU) 6, a memory 7, a plotter device 8 that is an image forming apparatus, a plotter interface (I/F) unit 9, an operation display unit 10, a line I/F unit 11, an network I/F unit 12, a South Bridge (SB) 13, and a Read Only Memory (ROM) 14.

The reading unit 1 includes a line sensor consisting of a Charge-Coupled Device (CCD) photoelectric conversion element, an Analog-to-Digital (A/D) converting unit, and a driving circuit for the CCD photoelectric conversion element and the A/D converting unit. Based on grayscale data of a document that is obtained by scanning the document, the reading unit 1 generates digital image data in the form of 8-bit Red/Blue/Green (RGB) image data and outputs the generated digital image data.

The first image-data processing unit 2 carries out a process on the digital image data that is output from the reading unit 1 to integrate the digital image data to predetermined characteristics. The integrated characteristics are appropriate for image conversion at a destination when reusing the image data that is accumulated in the HDD 5. The integrated characteristics are explained in detail later.

The bus control unit 3 is a data-bus control unit that carries out transactions of various types of data such as the necessary image data and control commands inside the digital color MFP 100. The bus control unit 3 also includes a bridge function between various types of bus standards. According to the present embodiment, a Peripheral Component Interface (PCI) express bus connects the bus control unit 3 to the first image-data processing unit 2, the second image-data processing unit 4, and the CPU 6. The bus control unit 3 is connected to the HDD 5 by an Advanced Technology Attachment (ATA) bus, thereby forming an Application Specific Integrated Circuit (ASIC).

The second image-data processing unit 4 carries out image processing on the digital image data that is integrated to the predetermined characteristics by the first image-data processing unit 2, and outputs the digital image data. The second image-data processing unit 4 carries out image processing that is appropriate for the destination that is specified by a user. The image processing by the second image-data processing unit 4 is explained in detail later.

The HDD 5 is a large scale memory device that is also used in a personal computer for storing electronic data. In the digital color MFP 100, the HDD 5 is mainly used to accumulate the digital image data and related data of the digital image data (for example, setting mode etc.). A hard disk used according to the present embodiment includes the ATA bus connection that is standardized by expanding Integrated Drive Electronics (IDE).

The CPU 6 is a microprocessing unit that controls the entire digital color MFP 100. In an integrated CPU that is used according to the present embodiment, additional functions are added to a CPU core unit that is widely used recently. A connecting function with a universal standard interface or bus connecting functions that use a cross bar switch are integrated in the CPU that is used according to the present embodiment.

When the CPU 6 carries out control of the entire digital color MFP 100, the memory 7, which is a volatile memory, temporarily stores data that is transacted or temporarily stores programs and intermediate process data for absorbing a speed difference during bridging between various types of bus standards or for absorbing a processing speed difference between the connected components themselves because the CPU 6 needs to carry out high speed processes, during normal activation the CPU 6 uses a boot program stored in the ROM 14 to activate the system, and carries out processes by using the programs that are expanded to the high speed accessible memory 7. According to the present embodiment, a Dual Inline Memory Module (DIMM) that is used in standardized personal computers is used as the memory 7.

Upon fetching the digital image data consisting of Cyan Magenta Yellow Key (CMYK), the plotter device 8 carries out an electro photographic process using a laser beam to output the fetched image data on a transfer sheet.

Upon fetching the digital image data consisting of CMYK that is sent via the universal standard interface that is integrated in the CPU 6, the plotter I/F unit 9 carries out a bus bridge process to output the digital image data to an exclusive interface of the plotter device 8. According to the present embodiment, the PCI express bus is used as the universal standard interface.

The SB 13 is one of the chipsets that are used in the personal computer and is a universal electronic device called as South Bridge. The SB 13 is a bridge function, in the form of a universal circuit, of a bus that is widely used during construction of a system that mainly includes a PCI Express-Industrial Standard Architecture (PCI-ISA) bridge. According to the present embodiment, the SB 13 bridges the CPU 6 and the ROM 14.

The ROM 14 stores various types of programs (including the boot program) during control of the entire digital color MFP 100 by the CPU 6. The ROM 14 stores programs such as a copying operation process program (copy application), a scanner distribution process program (scanner distribution application), a fax transmission process program (fax application) etc.

Figure 2:
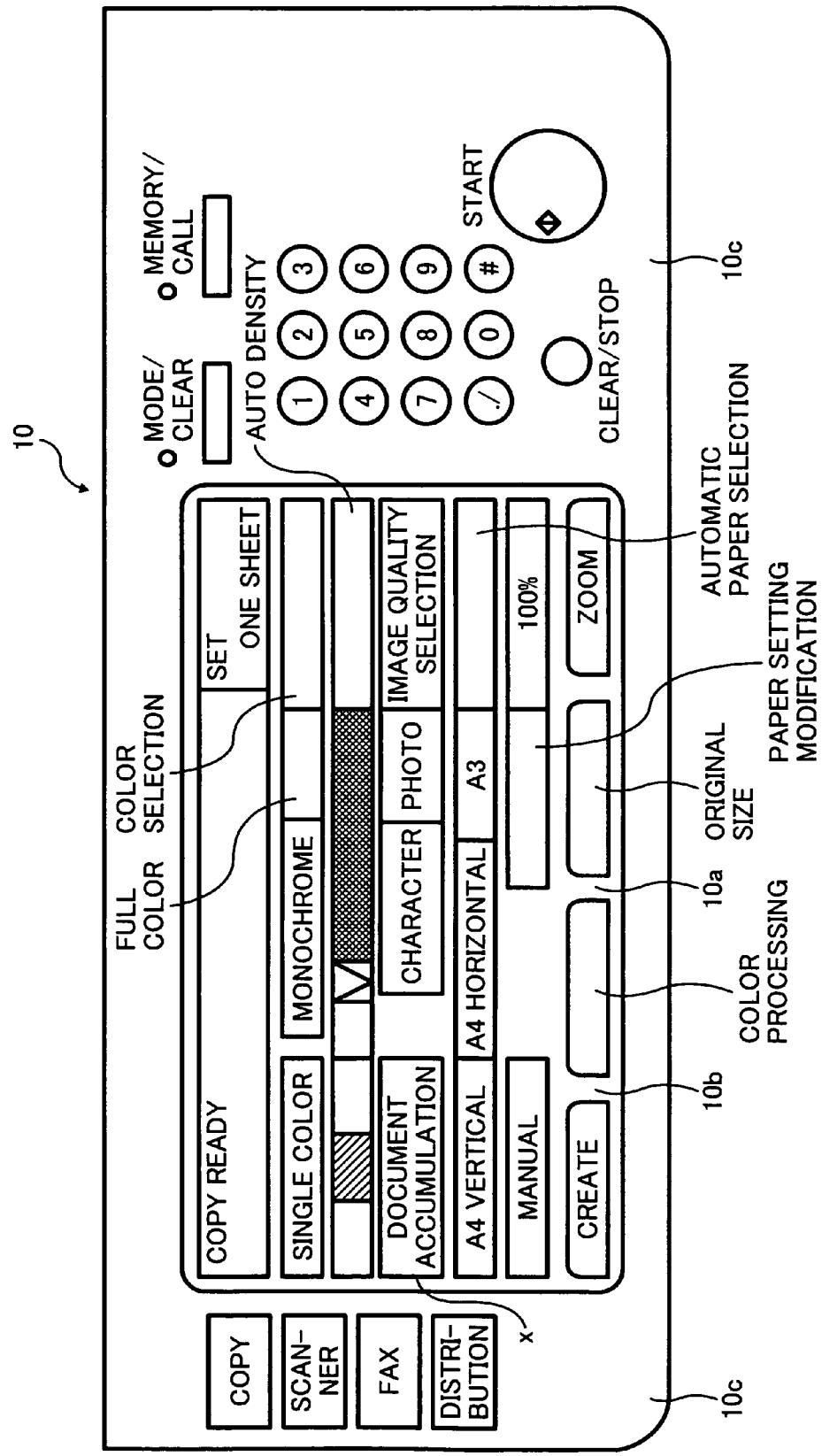
FIG. 2 is a schematic of a structure of an operation display unit.

The operation display unit 10 functions as an interface between the digital color MFP 100 and the user. As shown in FIG. 2, the operation display unit 10 includes a Liquid Crystal Display (LCD) 10b that includes a touch panel 10a, and key switches 10c that include various process mode setting keys, numeric keys, a start key etc. The operation display unit 10 displays various types of status and operation methods of the operation display unit 10 in the LCD 10b and detects an input from the user via the touch panel 10a and the key switches 10c. According to the present embodiment, the operation display unit 10 is connected to the CPU 6 via the PCI express bus.

Process modes that can be selected by the user include a color/monochrome mode, an application mode, and an image quality mode. To be specific, the color/monochrome mode includes a full color mode, a single color mode, and a monochrome mode. The application mode includes a copy mode, a scanner mode, a fax mode, a scanner distribution mode, etc. The image quality mode includes a character mode, a character photo mode, a photo mode, etc. The image quality mode also includes notch data such as darkening and lightening the document image.

The line I/F unit 11 connects the PCI express bus and a telephone line. The line I/F unit 11 enables the digital color MFP 100 to carry out transfer of various types of data via the telephone line with a fax 15 that is an image output device (image processing unit).

The network I/F unit 12 connects the PCI express bus and an external device 16 that is the image output device (image processing unit) such as the personal computer. The network I/F unit 12 enables the digital color MFP 100 to carry out transactions of various types of data with the external device 16. According to the present embodiment, a network (Ethernet™) is used as a connecting interface. In other words, the digital color MFP 100 is connected to the network via the network I/F unit 12. The external device 16 exercises various types of control on the digital color MFP 100, inputs image data into the digital color MFP 100, and outputs image data from the digital color MFP 100 via installed application software and drivers.

A characteristic process of the digital color MFP 100 according to the present embodiment is explained next. In the characteristic process of the digital color MFP 100 according to the present embodiment, the image data obtained by scanning the document is accumulated and stored in the HDD 5 and the image data that is accumulated and stored in the HDD 5 is reused.

An operation of a copying process and a process to accumulate and store the image data in the HDD 5 is explained first.

When the user sets the document in the reading unit 1, and carries out in the operation display unit 10, setting of a desired mode and input of the copying operation and start of accumulation and storage in the HDD 5, the operation display unit 10 converts data that is input from the user into copy start control command data inside the digital color MFP 100 and issues the converted copy start control command data. The issued copy start control command data is notified to the CPU 6 via the PCI express bus. The user operates a document accumulation key X of the operation display unit 10 during the copy mode to input the copying operation and start of accumulation and storage in the HDD 5. If the document accumulation key X is not operated, only the copying operation is input without accumulation and storage in the HDD 5. Thus, a reuse determining unit is realized.

The CPU 6 executes the copying operation process program (the copy application) according to the copy start control command data, and sequentially carries out settings and operations that are necessary for the copying operation. Next, the copying operation process is sequentially explained.

The digital image data in the form of 8-bit RGB image data that is obtained by scanning the document by the reading unit 1 is integrated to the predetermined characteristics by the first image-data processing unit 2 and sent to the bus control unit 3.

Figure 3:
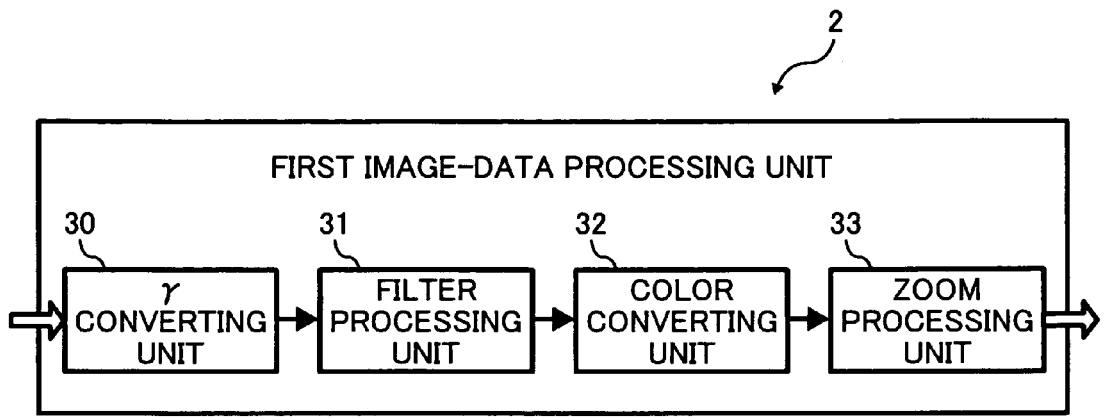
FIG. 3 is a process block diagram of a first image-data processing unit.

The first image-data processing unit 2 is explained in detail. FIG. 3 is a process block diagram of the first image-data processing unit 2. As shown in FIG. 3, the first image-data processing unit 2 includes a γ-converting unit 30, a filter processing unit 31, a color converting unit 32, and a zoom processing unit 33. The γ-converting unit 30 integrates brightness of the RGB image data fetched from the reading unit 1 to the predetermined characteristics. According to the present embodiment, brightness of the RGB image data is converted into linear characteristics. The filter processing unit 31 integrates sharpness of the RGB image data to the predetermined characteristics. According to the present embodiment, sharpness of the RGB image data is converted such that upon scanning a standard chart such as the standard chart shown in FIG. 4, each number of lines becomes equal to a predetermined value of Modulation Transfer Function (MTF) characteristics. The color converting unit 32 integrates colors of the RGB image data to the predetermined characteristics. According to the present embodiment, the color converting unit 32 converts the colors such that color space becomes equal to a standard color space such as Adobe RGB color space (Adobe is a trademark of Adobe Systems Incorporated). The well-known three-dimensional lookup method is used as a method of color conversion. The zoom processing unit 33 integrates a size (resolution) of the RGB image data to the predetermined characteristics. According to the present embodiment, the zoom processing unit 33 converts the size (resolution) to 600 dot per inch (dpi). A method that calculates digital interpolation from peripheral pixels towards a known focus position is used as a method of zoom processing.

Upon fetching the RGB image data from the first image-data processing unit 2, the bus control unit 3 accumulates the RGB image data in the memory 7 via the CPU 6. The RGB image data that is accumulated in the memory 7 is transmitted to the HDD 5 via the CPU 6 and the bus control unit 3. The RGB image data is accumulated and stored in the HDD 5 along with a mode setting at the time of input.

Next, the RGB image data that is accumulated in the memory 7 is output to the plotter device 8 via the second image-data processing unit 4, and a copy of the document is generated.

Figure 5:
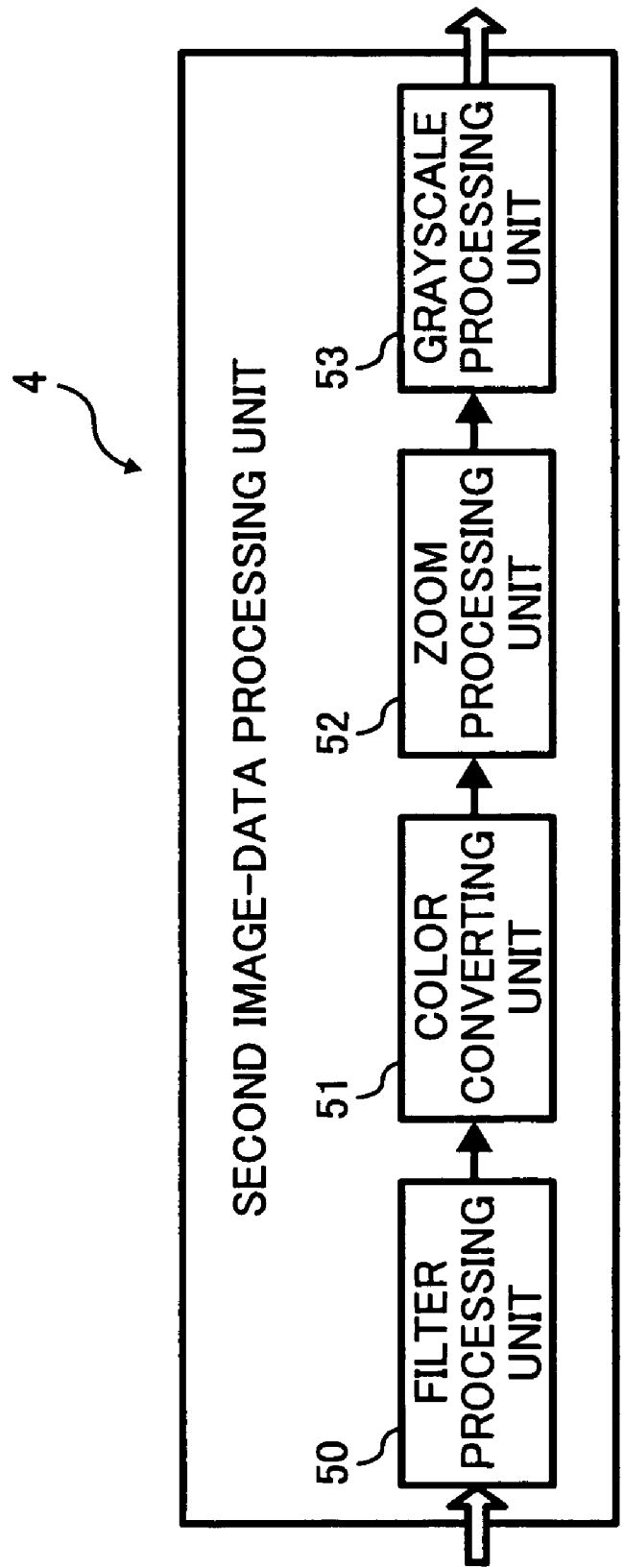
FIG. 5 is a process block diagram of a second image-data processing unit.

Next, the second image-data processing unit 4 that carries out the copying operation is explained in detail. FIG. 5 is a process block diagram of the second image-data processing unit 4. As shown in FIG. 5, the second image-data processing unit 4 includes a filter processing unit 50, a color converting unit 51, a zoom processing unit 52, and a grayscale processing unit 53. The filter processing unit 50 corrects sharpness of the RGB image data such that reproducibility of the RGB image data that is output to the plotter device 8 is improved. To be specific, the filter processing unit 50 carries out a sharpening processing unit a smoothing process according to a desired mode data. For example, in the character mode, the filter processing unit 50 carries out the sharpening process to clearly emphasize characters, and in the photo mode, the filter processing unit 50 carries out the smoothing process to smoothly represent grayscale tones. According to the present embodiment, the well-known three-dimensional lookup method is used as a method of conversion. Upon fetching the 8-bit RGB image data, the color converting unit 51 converts the color space to 8-bit CMYK that is a color space used by the plotter device 8. During the aforementioned conversion of the color space, the user also controls color saturation according to the desired mode data. The zoom processing unit 52 converts a size (resolution) of the CMYK image data to a size (resolution) according to reproduction performance of the plotter device 8. According to the present embodiment, because the reproduction performance of the plotter device 8 is an output of 600 dpi, a conversion is not carried out. Upon fetching the 8-bit CMYK image data, the grayscale processing unit 53 carries out a pixel number conversion process according to a grayscale capacity of the plotter device 8. According to the present embodiment, the grayscale processing unit 53 carries out the pixel number conversion process by using an error diffusion method, which is one of the pseudo-halftone processes, on 2-bit CMYK image data.

An operation process to reuse the image data that is accumulated and stored in the HDD 5 is explained next.

A fax transmission process is explained first. During the copying operation, when the user carries out an input into the operation display unit 10, of a desired mode setting and start of fax transmission of the image data that is accumulated in the HDD 5, the operation display unit 10 converts the data input from the user into fax operation start control command data inside the digital color MFP 100, and issues the fax operation start control command data. The issued fax operation start control command data is notified to the CPU 6 via the PCI express bus.

The CPU 6 executes the fax transmission process program (fax application) according to the fax transmission start control command data, and sequentially carries out settings and operations that are necessary for the fax transmission operation. Next, the fax transmission operation process is sequentially explained.

The bus control unit 3 outputs to the memory 7 via the CPU 6, the RGB image data that is accumulated in the HDD 5 along with the mode setting at the time of input.

Next, the RGB image data that is accumulated in the memory 7 is output to the line I/F unit 11 via the second image-data processing unit 4, and fax transmission is carried out.

Next, the second image-data processing unit 4 that carries out the fax transmission is explained in detail with reference to FIG. 5. The filter processing unit 50 corrects the sharpness of the RGB image data to improve reproducibility of the RGB image data that is fax transmitted. To be specific, the filter processing unit 50 carries out the sharpening processing unit the smoothing process according to the desired mode data. For example, in the character mode, the filter processing unit 50 carries out the sharpening process to clearly emphasize characters, and in the photo mode, the filter processing unit 50 carries out the smoothing process to smoothly represent grayscale tones. Upon fetching the 8-bit RGB image data, the color converting unit 51 uses the fax 15 to convert the 8-bit RGB image data to commonly used 8-bit single color (monochrome) image data. The zoom processing unit 52 converts the size (resolution) of the monochrome image data to a size (resolution) that is transceived by the fax 15. According to the present embodiment, the zoom processing unit 52 converts the size (resolution) of the monochrome image data to a size (resolution) of 200 dpi in a main scanning direction by 100 dpi in a secondary scanning direction. According to the present embodiment, the method that calculates digital interpolation from peripheral pixels towards a known focus position is used as a method of conversion. Upon fetching the 8-bit monochrome image data, the grayscale processing unit 53 carries out the pixel number conversion process according to a grayscale capacity that is transceived by the fax 15. According to the present embodiment, the grayscale processing unit 53 carries out a pixel number conversion to a binary value by using the error diffusion method that is one of the pseudo-halftone processes.

The scanner distribution process is explained first. During the copying operation, when the user carries out an input into the operation display unit 10, of the desired mode setting and start of scanner distribution of the image data that is accumulated in the HDD 5, the operation display unit 10 converts the data input from the user into scanner distribution start control command data inside the digital color MFP 100, and issues the scanner distribution start control command data. The issued scanner distribution start control command data is notified to the CPU 6 via the PCI express bus.

The CPU 6 executes the scanner distribution process program (scanner distribution application) according to the scanner distribution start control command data, and sequentially carries out settings and operations that are necessary for the scanner distribution operation. Next, the scanner distribution operation process is sequentially explained.

The bus control unit 3 outputs to the memory 7 via the CPU 6, the RGB image data that is accumulated in the HDD 5 along with the mode setting at the time of input.

Next, the RGB image data that is accumulated in the memory 7 is output to the network I/F unit 12 via the second image-data processing unit 4, and scanner distribution is carried out.

Next, the second image-data processing unit 4 that carries out the scanner distribution is explained in detail with reference to FIG. 5. The filter processing unit 50 corrects the sharpness of the RGB image data to improve reproducibility of the RGB image data that is scanner distributed. To be specific, the filter processing unit 50 carries out the sharpening processing unit the smoothing process according to the desired mode data. For example, in the character mode, the filter processing unit 50 carries out the sharpening process to clearly emphasize characters, and in the photo mode, the filter processing unit 50 carries out the smoothing process to smoothly represent grayscale tones. Upon fetching the 8-bit RGB image data, the color converting unit 51 converts the 8-bit RGB image data to a specified color space. According to the present embodiment, the color converting unit 51 converts the 8-bit RGB image data to sRGB color space that is commonly used in scanner distribution. The zoom processing unit 52 converts the size (resolution) of sRGB image data to a size (resolution) that is transceived in the specified scanner distribution. According to the present embodiment, the zoom processing unit 52 converts the size (resolution) of the sRGB image data to a size (resolution) of 200 dpi in the main scanning direction by 200 dpi in the secondary scanning direction. The grayscale processing unit 53 carries out the pixel number conversion process according to the grayscale capacity that is transceived in the specified scanner distribution. According to the present embodiment, 160,000 colors of the 8-bit RGB image data are specified, and the grayscale process is not carried out.

In the digital color MFP 100 according to the present embodiment, mode setting related to colors can be carried out when carrying out various application operations.

For example, in the copying operation, the color mode reproduces a color document in color. The monochrome mode reproduces the color document in monochrome. The single color mode reproduces the color document in a single color such as cyan or magenta. A color conversion mode converts a specified color into another color. In the fax transmission operation, because a color fax is not commonly used, the color document is transmitted as monochrome data. In the scanner distribution operation, because a destination is the external device 16 such as the personal computer that enables compatibility with multicolor modes, a full color mode of 8-bit RGB, a grayscale mode of 8-bit gray in monochrome, a monochrome binary mode of binary monochrome etc. are included.

Thus, the 8-bit RGB digital image data that is obtained by scanning the document by the reading unit 1 is integrated to the predetermined characteristics (color space) by the first image-data processing unit 2 and accumulated and stored in the HDD 5. The second image-data processing unit 4 carries out a color conversion process according to the mode setting related to colors that are specified by the user. Due to this, even if the mode setting related to colors of the image data that is accumulated and stored in the HDD 5 is modified during output, the mode setting can be modified without causing any change in the image quality compared to the image quality during normal operation (the operation when the mode setting related to colors is specified from the beginning), thereby significantly enhancing the reusability. For example, the image data that is stored by setting the single color (magenta) mode of the copy application can be output in full color during output. Further, the image data that is stored by setting the fax transmission (monochrome) mode can be output to the plotter device 8 in the full color.

An operation to deal with the mode setting related to colors when the RGB image data is not accumulated and stored in the HDD 5 is explained next.

If the RGB image data is not accumulated and stored in the HDD 5, according to the mode setting in the operation application, the color converting unit 32 of the first image-data processing unit 2 converts the 8-bit RGB digital image data that is obtained by scanning the document to the image data of a specified color. The image data that is processed by the first image-data processing unit 2 is processed by the second image-data processing unit 4 via the bus control unit 3, the CPU 6, and the memory 7, and transmitted to a specified destination. The color converting unit 51 of the second image-data processing unit 4 does not carry out any operation during the aforementioned transmission.

Due to this, if the RGB image data is not accumulated and stored in the HDD 5, from among the various types of mode setting the first image-data processing unit 2 reduces the number of colors, for example, in the mode setting such as a single color copy mode that reduces the number of colors. In other words, because the number of colors is reduced by the first image-data processing unit 2, the amount of the image data that flows via the bus control unit 3, the CPU 6, and the memory 7 is reduced, thereby enabling to speedily carry out the process without causing any change in the image quality compared to the image quality when the image data is accumulated and stored in the HDD 5 and output (reused), thus enabling to enhance the productivity of the digital color MFP 100. For example, the image data that is accumulated by setting the single color (magenta) mode of the copy application can be converted from the RGB image data into the single color (magenta) data using the first image-data processing unit 2, thereby reducing the amount of the image data to one third of the RGB image data, reducing a load on the buses, and enhancing the process speed.

The digital color MFP 100 according to the present embodiment enables the mode setting related to size when carrying out each application operation.

For example, a size modification mode that enlarges or reduces the size of the document is included in the copying operation. A mode that combines two documents of A4 size on a single transfer sheet of A4 size is also included. Further, in the fax transmission operation, the resolution can be switched to 100 dpi, 200 dpi, and 300 dpi in a normal mode, a small character mode, and a minute mode respectively. Because the resolution indicates a number of data per unit length and enlargement or reduction is also indicated by a number of data per unit length of the digital image data, the resolution and the enlargement or the reduction are treated as considerations related to the same size. In the scanner distribution operation, the destination is the external device 16 such as the personal computer, thereby enabling a specification of multicolor resolution.

Thus, the 8-bit RGB digital image data that is obtained by scanning the document by the reading unit 1 is integrated to the predetermined characteristics (size) by the first image-data processing unit 2 and accumulated and stored in the HDD 5. The second image-data processing unit 4 carries out a size conversion process according to the mode setting related to a size that is specified by the user. Due to this, even if the mode setting, related to the size of the image data that is accumulated and stored in the HDD 5, is modified during output, the mode setting can be modified without causing any change in the image quality compared to the image quality during normal operation (the operation when the mode setting related to size is specified from the beginning), thereby significantly enhancing the reusability. For example, the image data that is accumulated by setting a 50 percent reduction mode of the copy application can be output in the same size (100 percent) during output. Further, the image data that is accumulated by setting the fax transmission (200 dpi) mode can be output to the plotter device 8 in the same size (100 percent) without causing any change in the image quality compared to the image quality of a normal copy image.

An operation to deal with the mode setting related to size when the RGB image data is not accumulated and stored in the HDD 5 is explained next.

If the RGB image data is not accumulated and stored in the HDD 5, according to the mode setting of a size in the operation application, the zoom processing unit 33 of the first image-data processing unit 2 converts the 8-bit RGB digital image data that is obtained by scanning the document using the reading unit 1 to the image data of a specified size. The image data that is processed by the first image-data processing unit 2 is processed by the second image-data processing unit 4 via the bus control unit 3, the CPU 6, and the memory 7, and transmitted to a specified destination. The zoom processing unit 52 of the second image-data processing unit 4 does not carry out any operation during the aforementioned transmission.

Due to this, if the RGB image data is not accumulated and stored in the HDD 5, from among the various types of mode setting, the first image-data processing unit 2 reduces the size, for example, in the mode setting such as a reduction copy mode that reduces the size. In other words, because the size is reduced by the first image-data processing unit 2, the amount of the image data that flows via the bus control unit 3, the CPU 6, and the memory 7 is reduced, thereby enabling to speedily carry out the process without causing any change in the image quality compared to the image quality when the image data is accumulated and stored in the HDD 5 and output (reused), thus enabling to enhance the productivity of the digital color MFP 100. For example, the image data that is accumulated by setting the 50 percent reduction mode is converted into the image data of size that is reduced by 50 percent using the first image-data processing unit 2, thereby reducing the amount of the image data to 25 percent, reducing the load of the buses, and enhancing the process speed.

The operation that is explained according to the present embodiment is used when a destination other than a destination at the time of input is desired for the image data that is accumulated and stored in the HDD 5 of the digital color MFP 100. However, a mode setting that differs from the mode setting at the time of input can also be desired. An example of a setting modification in a scanner distribution respecifying operation is used to explain a change in the mode setting.

When the user carries out an input into the operation display unit 10, of the desired mode setting and start of scanner distribution of the image data that is accumulated in the HDD 5, the mode setting that is specified during accumulation of the image data in the HDD 5 is modified to a different mode setting by the user. The operation display unit 10 converts the data input from the user into scanner distribution start control command data inside the digital color MFP 100, and issues the scanner distribution start control command data. The issued scanner distribution control command data is notified to the CPU 6 via the PCI express bus.

The CPU 6 executes the scanner distribution process program (scanner distribution application) according to the scanner distribution start control command data, and sequentially carries out settings and operations that are necessary for the scanner distribution operation. Next, the scanner distribution operation process is sequentially explained.

The bus control unit 3 outputs to the memory 7 via the CPU 6, the RGB image data that is accumulated in the HDD 5 along with the mode setting at the time of input.

Next, the RGB image data that is accumulated in the memory 7 is output to the network I/F unit 12 via the second image-data processing unit 4, and scanner distribution is carried out.

Figure 4:
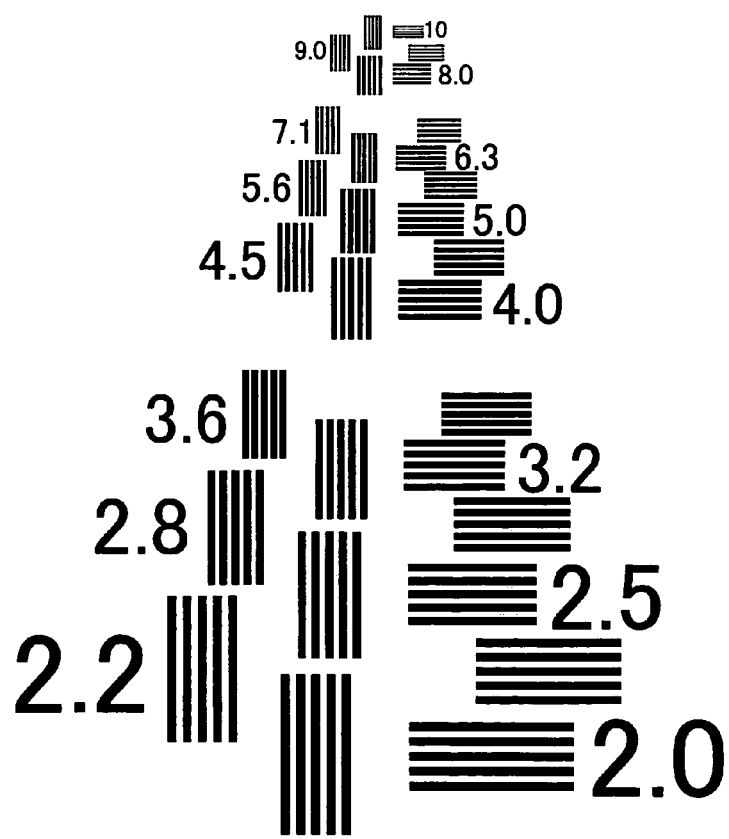
FIG. 4 is a schematic of a standard chart for integrating sharpness of RGB image data in a filter processing unit to predetermined characteristics.

Next, the second image-data processing unit 4 that carries out the scanner distribution is explained in detail with reference to FIG. 4. The filter processing unit 50 corrects the sharpness of the RGB image data to improve reproducibility of the RGB image data that is scanner distributed. To be specific, the filter processing unit 50 carries out the sharpening processing unit the smoothing process according to the desired mode data. For example, in the character mode, the filter processing unit 50 carries out the sharpening process to clearly emphasize characters, and in the photo mode, the filter processing unit 50 carries out the smoothing process to smoothly represent grayscale tones. Upon fetching the 8-bit RGB image data, the color converting unit 51 converts the 8-bit RGB image data to a specified color space. According to the present embodiment, because the monochrome mode is respecified, the color converting unit 51 converts the 8-bit RGB image data into 8-bit single color (monochrome) image data. The zoom processing unit 52 converts the size (resolution) of the sRGB image data to a size (resolution) that is transceived in the specified scanner distribution. According to the present embodiment, the zoom processing unit 52 converts the size (resolution) of the sRGB image data to a size (resolution) of 400 dpi in the main scanning direction by 400 dpi in the secondary scanning direction. The grayscale processing unit 53 carries out the pixel number conversion process according to the grayscale capacity that is transceived in the specified scanner distribution. According to the present embodiment, according to the respecified mode, the grayscale processing unit 53 carries out a pixel number conversion to a binary value by using the error diffusion method that is one of the pseudo-halftone processes.

Thus, according to the present embodiment, if reuse of the image data is declared, the image data is subjected to image processing in the first image-data processing unit 2, integrated to the predetermined characteristics, and accumulated in the HDD 5. Next, the image data that is accumulated in the HDD 5 is subjected to image processing by the second image-data processing unit 4 according to an image processing unit or an image processing mode of an image output destination. If a non reuse of the image data is declared, the image data is subjected to image processing by the first image-data processing unit 2 according to the image processing unit or the image processing mode of the image output destination, and further subjected to image processing by the second image-data processing unit 4 according to the image processing unit or the image processing mode of the image output destination without getting accumulated in the HDD 5. Due to this, upon a declaration of reuse of the image data, if a desired destination image processing unit or a desired image processing mode differ from the image processing unit or the image processing mode at the time of image input of the image data that is accumulated in the HDD 5, a modification of the destination image processing unit or the image processing mode is enabled without causing a change in the image quality compared to the image quality during the normal operation (the operation when the destination image processing unit or the image processing mode is specified from the beginning), thereby significantly enhancing the reusability.

An image data process can be divided into two split modules consisting of an integration process on the image data from the reading unit 1 and an output process according to the image processing unit of individual image output destinations, thereby enabling to respond to a combination request of an image processing unit of the desired image output destination or a new function request from the user simply by lining up the second image-data processing unit 4 without changing the main components. Further, simply upgrading the version of the second image-data processing unit 4 enables to similarly respond to a request of a new image processing unit that serves as the new image output destination or a new function request as a result of technological advances. Thus, the image data process enables to efficiently respond to a request modification from the user related to the image processing unit that serves as the image output destination.

The integration process on the image data from the reading unit 1 and the output process according to individual output destinations can be carried out separately, thereby enabling to separately carry out development, debugging, parameter designing etc. in device development, thus enhancing development efficiency and enabling to reduce the development period.

Because quality of the image data that is subjected to image processing by the first image-data processing unit 2 and accumulated in the HDD 5 is integrated to the predetermined characteristics, the image data that is accumulated in the HDD 5 can be used among various types of image processing units. In other words, among the various types of image processing units, the image data can be output to applications that differ from the applications that are used during accumulation and storage of the image data in the HDD 5, and the image data can also be output by carrying out settings that differ from the settings during accumulation and storage of the image data in the HDD 5.

According to the present embodiment, the 8-bit RGB digital image data, which is obtained by scanning the document using the reading unit 1, is converted by the first image data converting unit 2 into the 8-bit RGB image data of the standard color space. However, the 8-bit RGB digital image data can also be converted into the CMYK image data by the first image data converting unit 2.

According to the present invention, if reuse of image data is declared, after a first image-data processing unit carries out image processing to integrate the image data to predetermined characteristics and accumulate the image data in a memory device, a second image-data processing unit carries out image processing on the image data that is accumulated in the memory device according to an image processing unit or an image processing mode of an image output destination. If non reuse of the image data is declared, the first image-data processing unit carries out image processing on the image data according to the image processing unit or the image processing mode of the image output destination, and the second image-data processing unit carries out image processing on the image data according to the image processing unit or the image processing mode of the image output destination without the image data being accumulated in the memory device. Due to this, upon a declaration of reuse of the image data, if a desired destination image processing unit or a desired image processing mode differ from the image processing unit or the image processing mode at the time of image input of the image data that is accumulated in the memory device, a modification of the destination image processing unit or the image processing mode is enabled without causing a change in the image quality compared to the image quality during a normal operation (an operation when the destination image processing unit or the image processing mode is specified from the beginning), thereby significantly enhancing the reusability.

An image data process can be divided into two split modules consisting of an integration process on the image data from an image reading unit and an output process according to the image processing unit of individual image output destinations, thereby enabling to respond to a combination request of the image processing unit of a desired image output destination or a new function request from a user simply by lining up the second image-data processing unit without changing the main components. Further, simply upgrading the version of the second image-data processing unit enables to similarly respond to a request of a new image processing unit that serves as the new image output destination or a new function request as a result of technological advances. Thus, the image data process enables to efficiently respond to a request modification from the user related to the image processing unit that serves as the image output destination.

The integration process on the image data from the image reading unit and the output process according to individual output destinations can be carried out separately, thereby enabling to separately carry out development, debugging, parameter designing etc. in device development, thus increasing development efficiency and enabling to reduce the development period.

Because quality of the image data that is subjected to image processing by the first image-data processing unit and accumulated in the memory device is integrated to the predetermined characteristics, the image data that is accumulated in the memory device can be used among various types of image processing units. In other words, among the various types of image processing units, the image data can be output to applications that differ from the applications that are used during accumulation and storage of the image data in the memory device, and the image data can also be output by carrying out settings that differ from the settings during accumulation and storage of the image data in the memory device.

According to an embodiment of the present invention, the characteristics that are integrated in the image processing carried out by the first image-data processing unit are appropriate for image conversion in the image processing unit or the image processing mode of at least two or more image output destinations. Due to this, the second image-data processing unit shares image processing in the image processing unit or the image processing mode of at least two or more image output destinations, thereby enabling to share functions having the same aims in the image processing unit or the image processing mode of at least two or more image output destinations, thus enabling efficient implementation of functions.

Furthermore, according to an embodiment of the present invention, if reuse of the image data is declared and a number of colors at the time of image output is specified during reading of the image data by the image reading unit, the first image-data processing unit integrates quality of the colors of the image data such that a setting modification of the number of colors is enabled by the second image-data processing unit. Due to this, the image data that is set to a single color (magenta) mode of a copy application during accumulation can be output in full color at the time of output. Further, for example, the image data that is set to a fax transmission (monochrome) mode during accumulation can be output in full color to a plotter device that serves as the image processing unit.

Moreover, according to an embodiment of the present invention, if reuse of the image data is declared and a size at the time of image output is specified during reading of the image data by the image reading unit, the first image-data processing unit integrates the size of the image data such that a setting modification of the size is enabled by the second image-data processing unit. Due to this, the image data that is set to a 50 percent reduction mode of the copy application during accumulation can be output in the same size (100 percent) during output. Further, the image data that is set to the fax transmission (200 dpi) mode during accumulation can be output in the same size (100 percent) to the plotter device that serves as the image processing unit without causing any change in the image quality compared to the image quality of a normal copy image.

Furthermore, according to an embodiment of the present invention, if non reuse of the image data is declared and the number of colors at the time of image output is specified during reading of the image data by the image reading unit, the first image-data processing unit converts the quality of the colors of the image data according to the specified number of colors at the time of image output. Due to this, the number of colors is reduced by the first image-data processing unit, for example, in the mode setting such as the single color copy mode that reduces the number of colors, thereby reducing the amount of the image data, thus enabling to speedily carry out the process without causing any change in the image quality compared to the image quality during accumulation, storage, and output (reuse) of the image data in the memory device and enabling to enhance the productivity.

Moreover, according to an embodiment of the present invention, if non reuse of the image data is declared and the size at the time of image output is specified during reading of the image data by the image reading unit, the first image-data processing unit converts the size of the image data according to the specified size at the time of image output. Due to this, the size is reduced by the first image-data processing unit, for example, in the mode setting such as the reduction copy mode that reduces the size, thereby reducing the amount of the image data, thus enabling to speedily carry out the process without causing any change in the image quality compared to the image quality during accumulation, storage, and output (reuse) of the image data in the memory device and enabling to enhance the productivity.

Furthermore, according to an embodiment of the present invention, the image processing unit that is connected to the interface is an image forming apparatus that can print data on a transfer sheet or an image output device that can output data, thereby enabling to reuse the image data accumulated by the copy application in fax transmission or scanner distribution.

Moreover, according to an embodiment of the present invention, if reuse of the image data is declared, the image data is subjected to image processing by the first image-data processing unit, integrated to the predetermined characteristics, and accumulated in the memory device. Next, the image data that accumulated in the memory device is subjected to image processing by the second image-data processing unit according to the image processing unit or the image processing mode of the image output destination. If a non reuse of the image data is declared, the image data is subjected to image processing by the first image-data processing unit according to the image processing unit or the image processing mode of the image output destination, and further subjected to image processing by the second image-data processing unit according to the image processing unit or the image processing mode of the image output destination without getting accumulated in the memory device. Due to this, during a declaration of reuse of the image data, if a desired destination image processing unit or a desired image processing mode differ from the image processing unit or the image processing mode at the time of image input of the image data that is accumulated in the memory device, a modification of the destination image processing unit or the image processing mode is enabled without causing a change in the image quality compared to the image quality during the normal operation (the operation when the destination image processing unit or the image processing mode is specified from the beginning), thereby significantly enhancing the reusability.

The image data process can be divided into two split modules consisting of the integration process on the image data from the image reading unit and the output process according to the image processing unit of individual image output destinations, thereby enabling to respond to a combination request of the image processing unit of the desired image output destination or a new function request from the user simply by lining up the second image-data processing unit without changing the main components. Further, simply upgrading the version of the second image-data processing unit enables to similarly respond to a request of a new image processing unit that serves as the new image output destination or a new function request as a result of technological advances. Thus, the image data process enables to efficiently respond to a request modification from the user related to the image processing unit that serves as the image output destination.

The integration process on the image data from the image reading unit and the output process according to individual output destinations can be carried out separately, thereby enabling to separately carry out development, debugging, parameter designing etc. in device development, thus increasing development efficiency and enabling to reduce the development period.

Because quality of the image data that is subjected to image processing by the first image-data processing unit and accumulated in the memory device is integrated to the predetermined characteristics, the image data that is accumulated in the memory device can be used among various types of image processing units. In other words, among the various types of image processing units, the image data can be output to applications that differ from the applications that are used during accumulation and storage of the image data in the memory device, and the image data can also be output by carrying out settings that differ from the settings during accumulation and storage of the image data in memory device.

Furthermore, according to an embodiment of the present invention, the characteristics that are integrated in the image processing carried out by the first image-data processing unit are appropriate for image conversion in the image processing unit or the image processing mode of at least two or more image output destinations. Due to this, the second image-data processing unit shares image processing in the image processing unit or the image processing mode of at least two or more image output destinations, thereby enabling to share functions having the same aims in the image processing unit or the image processing mode of at least two or more image output destinations, thus enabling efficient implementation of functions.

Moreover, according to an embodiment of the present invention, if reuse of the image data is declared and the number of colors at the time of image output is specified during reading of the image data by the image reading unit, the first image-data processing unit integrates quality of the colors of the image data such that a setting modification of the number of colors is enabled by the second image-data processing unit. Due to this, the image data that is set to the single color (magenta) mode of the copy application during accumulation can be output in full color at the time of output. Further, for example, the image data that is set to the fax transmission (monochrome) mode during accumulation can be output in full color to the plotter device that serves as the image processing unit.

Furthermore, according to an embodiment of the present invention, if reuse of the image data is declared and the size at the time of image output is specified during reading of the image data by the image reading unit, the first image-data processing unit integrates the size of the image data such that a setting modification of the size is enabled by the second image-data processing unit. Due to this, the image data that is set to the 50 percent reduction mode of the copy application during accumulation can be output in the same size (100 percent) during output. Further, the image data that is set to the fax transmission (200 dpi) mode during accumulation can be output in the same size (100 percent) to the plotter device that serves as the image processing unit without causing any change in the image quality compared to the image quality of the normal copy image.

Moreover, according to an embodiment of the present invention, if non reuse of the image data is declared and the number of colors at the time of image output is specified during reading of the image data by the image reading unit, the first image-data processing unit converts the quality of the colors of the image data according to the specified number of colors at the time of image output. Due to this, the number of colors is reduced by the first image-data processing unit, for example, in the mode setting such as the single color copy mode that reduces the number of colors, thereby reducing the amount of the image data, thus enabling to speedily carry out the process without causing any change in the image quality compared to the image quality during accumulation, storage, and output (reuse) of the image data in the memory device and enabling to enhance the productivity.

Furthermore, according to an embodiment of the present invention, if non reuse of the image data is declared and the size at the time of image output is specified during reading of the image data by the image reading unit, the first image-data processing unit converts the size of the image data according to the specified size at the time of image output. Due to this, the size is reduced by the first image-data processing unit, for example, in the mode setting such as the reduction copy mode that reduces the size, thereby reducing the amount of the image data, thus enabling to speedily carry out the process without causing any change in the image quality compared to the image quality during accumulation, storage, and output (reuse) of the image data in the memory device and enabling to enhance the productivity.

Moreover, according to an embodiment of the present invention, if reuse of the image data is declared, the image data is subjected to image processing by the first image-data processing unit, integrated to the predetermined characteristics, and accumulated in the memory device. Next, the image data that is accumulated in the memory device is subjected to image processing by the second image-data processing unit according to the image processing unit or the image processing mode of the image output destination. If a non reuse of the image data is declared, the image data is subjected to image processing by the first image-data processing unit according to the image processing unit or the image processing mode of the image output destination, and further subjected to image processing by the second image-data processing unit according to the image processing unit or the image processing mode of the image output destination without getting accumulated in the memory device. Due to this, during a declaration of reuse of the image data, if a desired destination image processing unit or a desired image processing mode differ from the image processing unit or the image processing mode at the time of image input of the image data that is accumulated in the memory device, a modification of the destination image processing unit or the image processing mode is enabled without causing a change in the image quality compared to the image quality during the normal operation (the operation when the destination image processing unit or the image processing mode is specified from the beginning), thereby significantly enhancing the reusability.

The image data process can be divided into two split modules consisting of the integration process on the image data from the image reading unit and the output process according to the image processing unit of individual image output destinations, thereby enabling to respond to the combination request of the image processing unit of the desired image output destination or the new function request from the user simply by lining up the second image-data processing unit without changing the main components. Further, simply upgrading the version of the second image-data processing unit enables to similarly respond to the request of the new image processing unit that serves as the new image output destination or the new function request as a result of technological advances. Thus, the image data process enables to efficiently respond to the request modification from the user related to the image processing unit that serves as the image output destination.

The integration process on the image data from the image reading unit and the output process according to individual output destinations can be carried out separately, thereby enabling to separately carry out development, debugging, parameter designing etc. in device development, thus increasing development efficiency and enabling to reduce the development period.

Because quality of the image data that is subjected to image processing by the first image-data processing unit and accumulated in the memory device is integrated to the predetermined characteristics, the image data that is accumulated in the memory device can be used among various types of image processing units. In other words, among the various types of image processing units, the image data can be output to applications that differ from the applications that are used during accumulation and storage of the image data in the memory device, and the image data can also be output by carrying out settings that differ from the settings during accumulation and storage of the image data in the memory device.

Furthermore, according to an embodiment of the present invention, the characteristics that are integrated in the image processing carried out by the first image-data processing unit are appropriate for image conversion in the image processing unit or the image processing mode of at least two or more image output destinations. Due to this, the second image-data processing unit shares image processing in the image processing unit or the image processing mode of at least two or more image output destinations, thereby enabling to share functions having the same aims in the image processing unit or the image processing mode of at least two or more image output destinations, thus enabling efficient implementation of functions.

Furthermore, according to an embodiment of the present invention, if reuse of the image data is declared and the number of colors at the time of image output is specified during reading of the image data by the image reading unit, the first image-data processing unit integrates quality of the colors of the image data such that a setting modification of the number of colors is enabled by the second image-data processing unit. Due to this, the image data that is set to the single color (magenta) mode of the copy application during accumulation can be output in full color at the time of output. Further, for example, the image data that is set to the fax transmission (monochrome) mode during accumulation can be output in full color to the plotter device that serves as the image processing unit.

Moreover, according to an embodiment of the present invention, if reuse of the image data is declared and the size at the time of image output is specified during reading of the image data by the image reading unit, the first image-data processing unit integrates the size of the image data such that a setting modification of the size is enabled by the second image-data processing unit. Due to this, the image data that is set to the 50 percent reduction mode of the copy application during accumulation can be output in the same size (100 percent) during output. Further, the image data that is set to the fax transmission (200 dpi) mode during accumulation can be output in the same size (100 percent) to the plotter device that serves as the image processing unit without causing any change in the image quality compared to the image quality of the normal copy image.

Furthermore, according to an embodiment of the present invention, if non reuse of the image data is declared and the number of colors at the time of image output is specified during reading of the image data by the image reading unit, the first image-data processing unit converts the quality of the colors of the image data according to the specified number of colors at the time of image output. Due to this, the number of colors is reduced by the first image-data processing unit, for example, in the mode setting such as the single color copy mode that reduces the number of colors, thereby reducing the amount of the image data, thus enabling to speedily carry out the process without causing any change in the image quality compared to the image quality during accumulation, storage, and output (reuse) of the image data in the memory device and enabling to enhance the productivity.

Moreover, according to an embodiment of the present invention, if non reuse of the image data is declared and the size at the time of image output is specified during reading of the image data by the image reading unit, the first image-data processing unit converts the size of the image data according to the specified size at the time of image output. Due to this, the size is reduced by the first image-data processing unit, for example, in the mode setting such as the reduction copy mode that reduces the size, thereby reducing the amount of the image data, thus enabling to speedily carry out the process without causing any change in the image quality compared to the image quality during accumulation, storage, and output (reuse) of the image data in the memory device and enabling to enhance the productivity.

Although the invention has been described with respect to a specific embodiment for a complete and clear disclosure, the appended claims are not to be thus limited but are to be construed as embodying all modifications and alternative constructions that may occur to one skilled in the art that fairly fall within the basic teaching herein set forth.

What is claimed is:

1. An image processing apparatus comprising:
   an image reading unit that acquires image data from a document;
   a memory device that accumulates image data;
   a reuse determining unit that determines whether to reuse the image data;
   a first image-data processing unit that performs a first image processing on the image data;
   a second image-data processing unit that performs a second image processing on the image data on which the first image processing is performed; and
   an interface unit that outputs the image data on which the second image processing is performed, to an image processing unit that is connected to the interface unit, wherein
   when the reuse determining unit determines to reuse the image data,
      the first image-data processing unit performs the first image processing that includes unifying characteristics of the image data into predetermined characteristics,
      the memory device accumulates the image data on which the first image processing is performed, and
      the second image-data processing unit performs the second image processing, which complies with the image processing unit or a processing mode of the image processing unit of an image output destination, on the image data accumulated in the memory device, and
   when the reuse determining unit determines not to reuse the image data,
      the first image-data processing unit performs the first image processing, which complies with the image processing unit or a processing mode of the image processing unit of an image output destination, on the image data, and
      the second image-data processing unit performs the second image processing, which complies with the image processing unit or a processing mode of the image processing unit of an image output destination, on the image data on which the first image processing is performed.

2. The image processing unit according to claim 1, wherein the characteristics unified in the first image processing are characteristics appropriate for an image conversion in the image processing unit or the image processing mode of at least two image output destinations.

3. The image processing unit according to claim 1, wherein when the reuse determining unit determines to reuse the image data, and when number of colors at a time of an image output is specified at a time of acquiring the image data by the image reading unit, the first image-data processing unit unifies a color property of the image data so that the second image-data processing unit can change a setting of the number of colors when performing the second image processing on the image data.

4. The image processing unit according to claim 1, wherein when the reuse determining unit determines to reuse the image data, and when an image size at a time of an image output is specified at a time of acquiring the image data by the image reading unit, the first image-data processing unit unifies a size of the image data so that the second image-data processing unit can change a setting of the image size when performing the second image processing on the image data.

5. The image processing unit according to claim 1, wherein when the reuse determining unit determines not to reuse the image data, and when number of colors at a time of an image output is specified at a time of acquiring the image data by the image reading unit, the first image-data processing unit converts a color property of the image data according to the specified number of colors.

6. The image processing unit according to claim 1, wherein when the reuse determining unit determines not to reuse the image data, and when an image size at a time of an image output is specified at a time of acquiring the image data by the image reading unit, the first image-data processing unit converts a size of the image data according to the specified image size.

7. The image processing unit according to claim 1, wherein the image processing unit is either one of an image forming apparatus that can print the image data on a transfer medium and an image output apparatus that can output the image data.

8. A computer-readable recording medium that stores therein a computer program for controlling an image processing apparatus that includes
    an image reading unit that acquires image data from a document;
    a memory device that accumulates image data;
    a reuse determining unit that determines whether to reuse the image data;
    a first image-data processing unit that performs a first image processing on the image data;
    a second image-data processing unit that performs a second image processing on the image data on which the first image processing is performed; and
    an interface unit that outputs the image data on which the second image processing is performed, to an image processing unit that is connected to the interface unit, wherein
    the computer program causes a computer to execute:
        first performing, when the reuse determining unit determines to reuse the image data, including
            the first image-data processing unit performing the first image processing that includes unifying characteristics of the image data into predetermined characteristics;
            the memory device accumulating the image data on which the first image processing is performed; and
            the second image-data processing unit performing the second image processing, which complies with the image processing unit or a processing mode of the image processing unit of an image output destination, on the image data accumulated in the memory device; and
        second performing, when the reuse determining unit determines not to reuse the image data, including
            the first image-data processing unit performing the first image processing, which complies with the image processing unit or a processing mode of the image processing unit of an image output destination, on the image data; and
            the second image-data processing unit performing the second image processing, which complies with the image processing unit or a processing mode of the image processing unit of an image output destination, on the image data on which the first image processing is performed.

9. The computer-readable recording medium according to claim 8, wherein
    the characteristics unified in the first image processing are characteristics appropriate for an image conversion in the image processing unit or the image processing mode of at least two image output destinations.

10. The computer-readable recording medium according to claim 8, wherein
    when the reuse determining unit determines to reuse the image data, and when number of colors at a time of an image output is specified at a time of acquiring the image data by the image reading unit, the first image processing includes unifying a color property of the image data so that the second image-data processing unit can change a setting of the number of colors when performing the second image processing on the image data.

11. The computer-readable recording medium according to claim 8, wherein
    when the reuse determining unit determines to reuse the image data, and when an image size at a time of an image output is specified at a time of acquiring the image data by the image reading unit, the first image processing includes unifying a size of the image data so that the second image-data processing unit can change a setting of the image size when performing the second image processing on the image data.

12. The computer-readable recording medium according to claim 8, wherein
    when the reuse determining unit determines not to reuse the image data, and when number of colors at a time of an image output is specified at a time of acquiring the image data by the image reading unit, the first image processing includes converting a color property of the image data according to the specified number of colors.

13. The computer-readable recording medium according to claim 8, wherein
    when the reuse determining unit determines not to reuse the image data, and when an image size at a time of an image output is specified at a time of acquiring the image data by the image reading unit, the first image processing includes converting a size of the image data according to the specified image size.

14. An image processing method for an image processing apparatus that includes
    an image reading unit that acquires image data from a document;
    a memory device that accumulates image data;
    a reuse determining unit that determines whether to reuse the image data;
    a first image-data processing unit that performs a first image processing on the image data;
    a second image-data processing unit that performs a second image processing on the image data on which the first image processing is performed; and
    an interface unit that outputs the image data on which the second image processing is performed, to an image processing unit that is connected to the interface unit, the image processing method comprising:
    first performing, when the reuse determining unit determines to reuse the image data, including
        the first image-data processing unit performing the first image processing that includes unifying characteristics of the image data into predetermined characteristics;
        the memory device accumulating the image data on which the first image processing is performed; and the second image-data processing unit performing the second image processing, which complies with the image processing unit or a processing mode of the image processing unit of an image output destination, on the image data accumulated in the memory device; and second performing, when the reuse determining unit determines not to reuse the image data, including the first image-data processing unit performing the first image processing, which complies with the image processing unit or a processing mode of the image processing unit of an image output destination, on the image data; and the second image-data processing unit performing the second image processing, which complies with the image processing unit or a processing mode of the image processing unit of an image output destination, on the image data on which the first image processing is performed.

15. The image processing method according to claim 14, wherein
the characteristics unified in the first image processing are characteristics appropriate for an image conversion in the image processing unit or the image processing mode of at least two image output destinations.

16. The image processing method according to claim 14, wherein
when the reuse determining unit determines to reuse the image data, and when number of colors at a time of an image output is specified at a time of acquiring the image data by the image reading unit, the first image processing includes unifying a color property of the image data so that the second image-data processing unit can change a setting of the number of colors when performing the second image processing on the image data.

17. The image processing method according to claim 14, wherein
when the reuse determining unit determines to reuse the image data, and when an image size at a time of an image output is specified at a time of acquiring the image data by the image reading unit, the first image processing includes unifying a size of the image data so that the second image-data processing unit can change a setting of the image size when performing the second image processing on the image data.

18. The image processing method according to claim 14, wherein
when the reuse determining unit determines not to reuse the image data, and when number of colors at a time of an image output is specified at a time of acquiring the image data by the image reading unit, the first image processing includes converting a color property of the image data according to the specified number of colors.

19. The image processing method according to claim 14, wherein
when the reuse determining unit determines not to reuse the image data, and when an image size at a time of an image output is specified at a time of acquiring the image data by the image reading unit, the first image processing includes converting a size of the image data according to the specified image size.

* * * * *